UNITED STATES PATENT OFFICE.

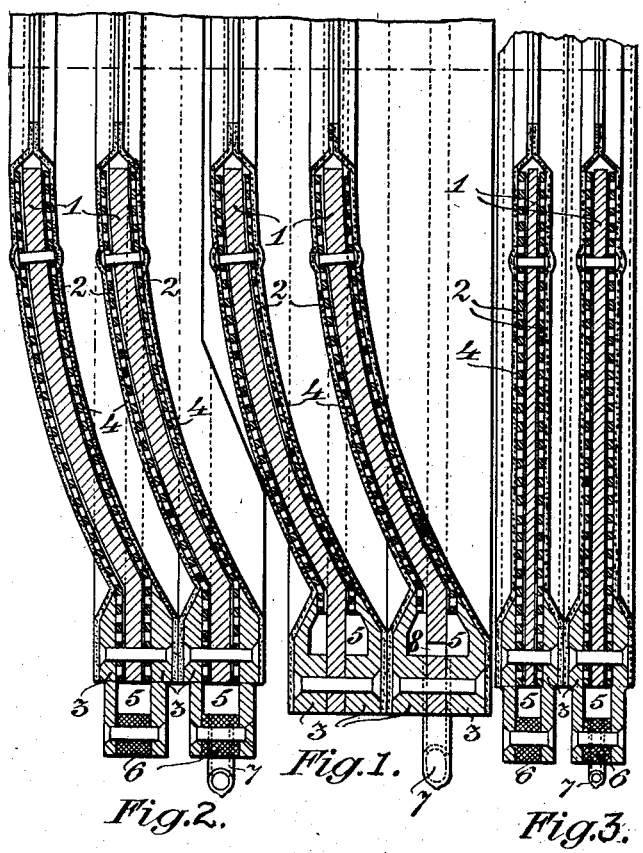

PHILIPP PORGES, OF VIENNA, AUSTRIA-HUNGARY, ASSIGNOR OF ONE-HALF TO LEO STEINSCHNEIDER, OF BRUNN, AUSTRIA-HUNGARY.

FILTER-PLATE.

1,091,080.  Specification of Letters Patent.  Patented Mar. 24, 1914.

Application filed June 3, 1912. Serial No. 701,246.

*To all whom it may concern:*

Be it known that I, PHILIPP PORGES, a subject of the Austro-Hungarian Emperor, residing at I, Stubenring 12, Vienna, in the Empire of Austria-Hungary, have invented an Improved Filter-Plate, of which the following is a specification.

The invention relates to chamber filter presses of the type comprising thin, flat or bossed metal sheets having strainer plates on both sides. In chamber presses of this kind the chambers are formed by frames at both sides of each metal sheet or plate and attached to said body plate, so that at each side of the metal sheet or plate a raised edge is formed which with the raised edge of the neighboring plate forms a chamber.

According to the present invention the two frames on each plate are constructed so as to form between them a completely surrounding annular channel or channels which collect the filtered liquid escaping from the filter.

Figures 1–3 of the accompanying drawings each show examples of filter plates constructed according to the present invention, portions of two superposed filter plates being shown in section in each figure.

In all figures 1 designates a plate of sheet metal or the like, 2 the perforated sheets or strainers secured at both sides and at a suitable distance from the said plate; 3 strengthening rings or frames along the circumference or borders of the plates, and 4 the filter cloths.

In the example shown in Fig. 1 the sieves do not extend quite to the outer periphery of the sheet metal plate but only partly below the strengthening rings 3, which are formed so as to constitute an annular channel 5 completely surrounding the whole plate. In the example shown the sheet metal plate divides the annular channel, so that each side of the plate is provided with its own annular channel. The two annular channels may be connected, if desired, by openings 8, so that they may be provided with a common outlet.

In the example shown in Fig. 2 the strengthening rings or frames 3 overlap the plate 1 and the strainers 2 are closed or bordered outwardly by a ring 6, so that a channel 5 extending along the outer periphery of the plate is formed, which channel is not partitioned or divided.

Fig. 3 shows a flat filter plate according to the present invention.

In the example shown in Figs. 1, 2 and 3 the filtered liquid flows at both sides of the plate from the periphery of the strainer into the annular channel 5 and escapes at a single point 7 into a collecting channel arranged along all filter-plates of the press. Since the outflow of the filtered liquid takes place only at a single point of the filter-plate, it can be observed at once whether a filter plate delivers turbid liquid or clear liquid, so that leakage between two plates is immediately apparent.

I claim as my invention:—

1. A filter plate comprising a body portion of sheet metal, and a rim portion comprising frames attached to said body portion, said frames having a channel extending around the rim portion formed between the same, in which channel the liquid escaping to the sides of the filter plate is adapted to collect.

2. A filter plate comprising a body portion of sheet metal, and a rim portion comprising frames attached to said body portion, said frames having a channel extending around the rim portion formed between the same, in which channel the liquid escaping to the sides of the filter plate is adapted to collect, and strainers arranged over the face of said body portion and extending to said channel.

3. A filter plate comprising a circular body portion of sheet metal, and an annular rim portion comprising annular frames attached to said body portion, said frames having an annular channel formed between the same in which the liquid escaping to the sides of said filter plate is adapted to collect.

4. A filter plate comprising a body portion of sheet metal and a rim portion comprising frames attached to said body portion opposite one another, said frames having a channel formed between the same and extending around said rim portion, said rim frames extending beyond the edges of said body portion and joined at their outer edges.

5. A filter plate comprising a body portion of sheet metal and a rim portion comprising frames attached to said body portion opposite one another, said frames having a channel formed between the same and extending around said rim portion, said rim frames extending beyond the edges of said body portion, and an intermediate strip joining the outer edge portions of said rim frames.

6. A filter plate comprising a body portion of sheet metal and a rim portion comprising frames attached to said body portion opposite one another, said frames having a channel formed between the same and extending around said rim portion, said rim-frames extending beyond the edges of said body portion and joined at their outer edges, and strainers arranged over the face of said body portion and extending to said channel.

In witness whereof, I have hereunto signed my name in the presence of two subscribing witnesses.

PHILIPP PORGES.

Witnesses:
 HUGO REIK,
 AUGUST FUGGER.